United States Patent
Bester et al.

(10) Patent No.: US 9,396,004 B1
(45) Date of Patent: Jul. 19, 2016

(54) SYSTEM AND METHOD FOR MANAGEMENT OF A CONFIGURATION OF A VIRTUAL MACHINE

(71) Applicant: ZERTO LTD., Herzliya (IL)

(72) Inventors: Ofer Bester, Tel-Aviv (IL); Doron Mayer, Kiryat Ono (IL); Omri Shefi, Ganei Tikva (IL); Yoav Morag, Givat Haim Ichud (IL); Yair Manor, Netanya (IL)

(73) Assignee: ZERTO LTD., Herzliya (IL)

( * ) Notice: Subject to any disclaimer, the term of this patent is extended or adjusted under 35 U.S.C. 154(b) by 0 days.

(21) Appl. No.: 14/691,584

(22) Filed: Apr. 21, 2015

(51) Int. Cl.
G06F 9/455 (2006.01)
G06F 15/16 (2006.01)
G06F 9/445 (2006.01)

(52) U.S. Cl.
CPC ........ G06F 9/44505 (2013.01); G06F 9/45533 (2013.01); G06F 9/45545 (2013.01)

(58) Field of Classification Search
CPC ... G06F 9/45558; G06F 9/5077; G06F 9/455; G06F 2009/45562; G06F 3/0647; G06F 3/067; G06F 3/0619; G06F 3/0605; G06F 9/44505; G06F 9/485; G06F 9/45533; G06F 21/53; G06F 2221/2149
See application file for complete search history.

(56) References Cited

U.S. PATENT DOCUMENTS

| | | | | |
|---|---|---|---|---|
| 8,151,263 | B1 * | 4/2012 | Venkitachalam | G06F 9/485 711/162 |
| 8,443,166 | B2 * | 5/2013 | Czezatke | G06F 11/1451 711/203 |
| 8,489,699 | B2 * | 7/2013 | Goggin | G06F 9/4856 709/213 |
| 9,037,718 | B2 * | 5/2015 | Igarashi | H04L 45/00 709/224 |
| 9,223,597 | B2 * | 12/2015 | Deshpande | G06F 9/45533 |
| 9,223,604 | B2 * | 12/2015 | Ichikawa | G06F 9/5077 |
| 2011/0154331 | A1 * | 6/2011 | Ciano et al. | 718/1 |
| 2014/0059539 | A1 * | 2/2014 | Simonsen | G06F 9/44505 718/1 |
| 2014/0189690 | A1 * | 7/2014 | Ramakrishnan Nair | G06F 9/461 718/1 |
| 2015/0341217 | A1 * | 11/2015 | Guerrero | H04W 4/001 709/221 |

OTHER PUBLICATIONS

Hines et al., Post-copy live migration of virtual machines, Jul. 2009, 13 pages.*
Liu et al., Performance and energy modeling for live migration of virtual machines, Jun. 2011, 11 pages.*
Li et al., A high-efficient inter-domain data transferring system for virtual machines, Feb. 2009, 6 pages.*

* cited by examiner

*Primary Examiner* — Thuy Dao
(74) *Attorney, Agent, or Firm* — Pearl Cohen Zedek Latzer Baratz LLP

(57) ABSTRACT

An embodiment of a system and method of managing a configuration of a virtual machine. An embodiment may include analyzing a configuration of a first computing system to identify a native configuration related to a first virtual machine and analyzing a second computing system to determine whether or not the native configuration should be used to configure the second computing system. If the native configuration should be used to configure the second virtual machine then an embodiment may include using the native configuration information to establish a second virtual machine on the second computing system, and if the native configuration should not be used to configure the second virtual machine then using the native configuration information to create intermediate configuration information and using the intermediate configuration information to establish a second virtual machine on the second computing system.

16 Claims, 4 Drawing Sheets

SYSTEM AND METHOD FOR MANAGEMENT OF A CONFIGURATION OF A VIRTUAL MACHINE

FIELD OF THE INVENTION

The present invention relates generally to configuration of virtual machines. More specifically, the present invention relates to an automated system and method for selecting a configuration for a virtual machine.

BACKGROUND

Virtual machines are known in the art. Generally, a virtual machine is a software component that emulates a physical computer, enabling software applications to run or execute on a physical machine or computer without having to be aware of the underlying hardware.

A hypervisor (or virtual machine monitor (VMM)) is a software, firmware or hardware component that creates and runs virtual machines. A computer on which a hypervisor is running one or more virtual machines is referred to in the art as a host machine. Each virtual machine running on a hypervisor is referred to in the art as a guest machine.

To enable proper operation, a virtual machine includes, operates according to, or is associated with, a set of specifications and/or configurations (the virtualization infrastructure) that are used in order to hide the physical aspects of the underlying hardware from the applications and/or enable the virtual machine to properly interact with the underlying hypervisor.

Each different virtualization infrastructure or type has a different way of describing the properties of a virtual machine and or underlying hardware or hypervisor. Accordingly, when replicating, migrating or converting virtual machines from one type of virtualization to another, a convertor is needed in order to translate the configuration from, e.g., virtualization of type "A" to virtualization of type "B".

Properties, configuration or attributes of a virtual machine may include a description of the emulated hardware used by the virtual machine (e.g., "virtual hardware properties" as referred to in the art). For example, properties, configuration or attributes of a virtual machine may include features or functions provided by a hypervisor and made available to a virtual machine (e.g., "high availability" as known in the art).

One of the problems associated with supporting a number of virtualization types is that the number of required convertors increases exponentially with the number of virtualization types to be supported. For example, when supporting 3 types of virtualization systems, e.g., types "A", "B" and "C"—the following convertors are needed: A→B, A→C, B→A, B→C, C→B, C→A. Adding another (fourth) virtualization type in the above example, will result in doubling the number of convertors.

Moreover, when adding a new virtual machine type, all existing convertors must be updated in order to enable converting existing virtual machine types to the new virtual machine type. In addition, work on each convertor is typically fairly delicate and requires the developer to be familiar with all hypervisor configuration types and maintain all conversion paths to from each type of virtual machine and hypervisor. Additionally, modification of any of the hypervisors' native configuration requires an update of all convertors. Moreover, incompatibility between configurations of different hypervisors may cause loss of information when converting or translating configuration information between hypervisors.

SUMMARY

An embodiment may include analyzing a configuration of a first system to identify a native configuration related to a first virtual machine; analyzing a second system to determine whether or not the native configuration should be used to configure the second system; and if the native configuration should be used to configure the second virtual machine then using the native configuration information to establish a second virtual machine on the second system, and if the native configuration should not be used to configure the second virtual machine then using the native configuration information to create intermediate configuration information and using the intermediate configuration information to establish a second virtual machine on the second system.

An embodiment may include determining that a hypervisor instance running on the first system is substantially the same as a hypervisor instance running on the second system and selecting to copy the native configuration from the first virtual machine to the second virtual machine. An intermediate configuration information may include at least one configuration parameter supported by at least two different hypervisors. A second virtual machine may be configured by an embodiment of a system or method such that a guest operating system executing on the first virtual machine can be executed on the second virtual machine substantially unchanged.

A single object including an intermediate configuration information may be used by an embodiment of a system or method to establish a plurality of virtual machines on a plurality of different virtualization infrastructures. An embodiment of a system or method may create an intermediate configuration by representing a property of a hypervisor by a predefined field in the intermediate configuration information. An embodiment of a system or method may identify a plurality of virtual machines on a first system and may configure a second system to support the plurality of virtual machines and preserve inter-dependencies between the plurality of virtual machines. An embodiment of a system or method may associate tags with parameters in an intermediate configuration wherein a tags indicates a compatibility with a specific hypervisor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
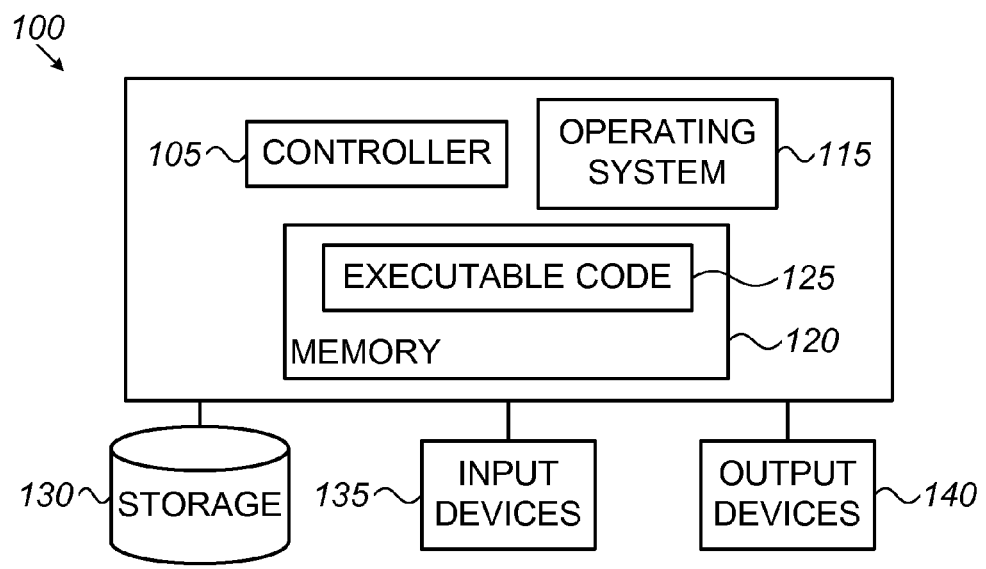
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

An embodiment of a system or method according to the invention may enable quickly and efficiently transferring a configuration of a virtual machine from one system to another. An embodiment of a system or method according to the invention may identify or determine a native configuration of a first system used for one or more virtual machines, and may create, and store, a copy of the native configuration. A configuration as referred to herein may be a set of parameters and values related to a system. For example, an intermediate or native configuration as referred to herein may be a file or a memory segment that includes parameters, values and the like. The terms "native configuration" and "generic configuration" used herein may mean, or refer to the same thing and may be used herein interchangeably.

In general, a native configuration as referred to herein may include any configuration data related to a virtual machine executing on a system. A native configuration may be a copy of an operative, already used configuration. An intermediate (or generic) configuration as referred to herein may be generated based on a native configuration. For example, using a native configuration, an intermediate configuration may be generated or created by representing, in an intermediate configuration, some of the parameters or configuration fields or elements in the a native configuration. Generally, the term "native configuration" is chosen to denote a configuration that is native to a system. For example, a native configuration may be a configuration that is specifically tailored for a specific hypervisor. For example, a native configuration may be a configuration that includes parameters supported by the specific hypervisor type and may not be suitable for another hypervisor type (e.g., the native configuration includes configuration parameters supported by a first hypervisor and not supported by the another, different hypervisor.) A generic or intermediate configuration may be usable with any hypervisor or system. For example, generic or intermediate configuration may include configuration parameters (and their values) supported by all known hypervisors. As described, a generic or intermediate configuration may be used in order to create a native configuration.

An embodiment of a system or method may generate, based on the native configuration, an intermediate configuration. An embodiment of a system or method may determine whether or not a second system (also used for one or more virtual machines) is substantially the same as the first system. For example, if the same hypervisor type is used on both systems, then an embodiment of a system or method of the invention may determine the systems are substantially the same.

If an embodiment of a system or method determines the second and first systems are substantially the same, an embodiment of a system or method may use the native configuration and/or the intermediate configuration in order to establish or configure a virtual machine on the second system or machine. For example, based on a native configuration (e.g., using parameters on the native configuration) of a virtual machine on a first system, an embodiment of a system or method of the invention may create a configuration enabling the virtual machine to run or execute on a second system. If a system and method determines the second and first systems are not the same, a system and method according to embodiments of the invention may use the intermediate configuration in order to create a configuration that enables the virtual machine to run or execute on the second system.

Reference is made to FIG. 1, showing a high level block diagram of an exemplary computing device according to embodiments of the present invention. Computing device 100 may include a controller 105 that may be, for example, a central processing unit (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc., for example by executing code or software stored in memory 120. More than one computing device 100 may be included, and one or more computing devices 100 may act as or include the various components, for example, convertor unit 220 shown in FIG. 2 may be, or may include components of, computing device 100.

For example, by executing executable code 125 stored in memory 120, controller 105 may be configured to carry out a method comprising determining a first and second virtual systems are the same and select to use a native configuration of the first virtual system in the second virtual system. Controller 105 may be configured to copy a native configuration from a first virtual system, generate an intermediate configuration using the native configuration, and use the intermediate configuration in a second virtual system as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein may be, or may include, controller 105 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

A system according to embodiments of the invention may include components such as, but not limited to, a plurality of central processing units (CPU) or any other suitable multipurpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
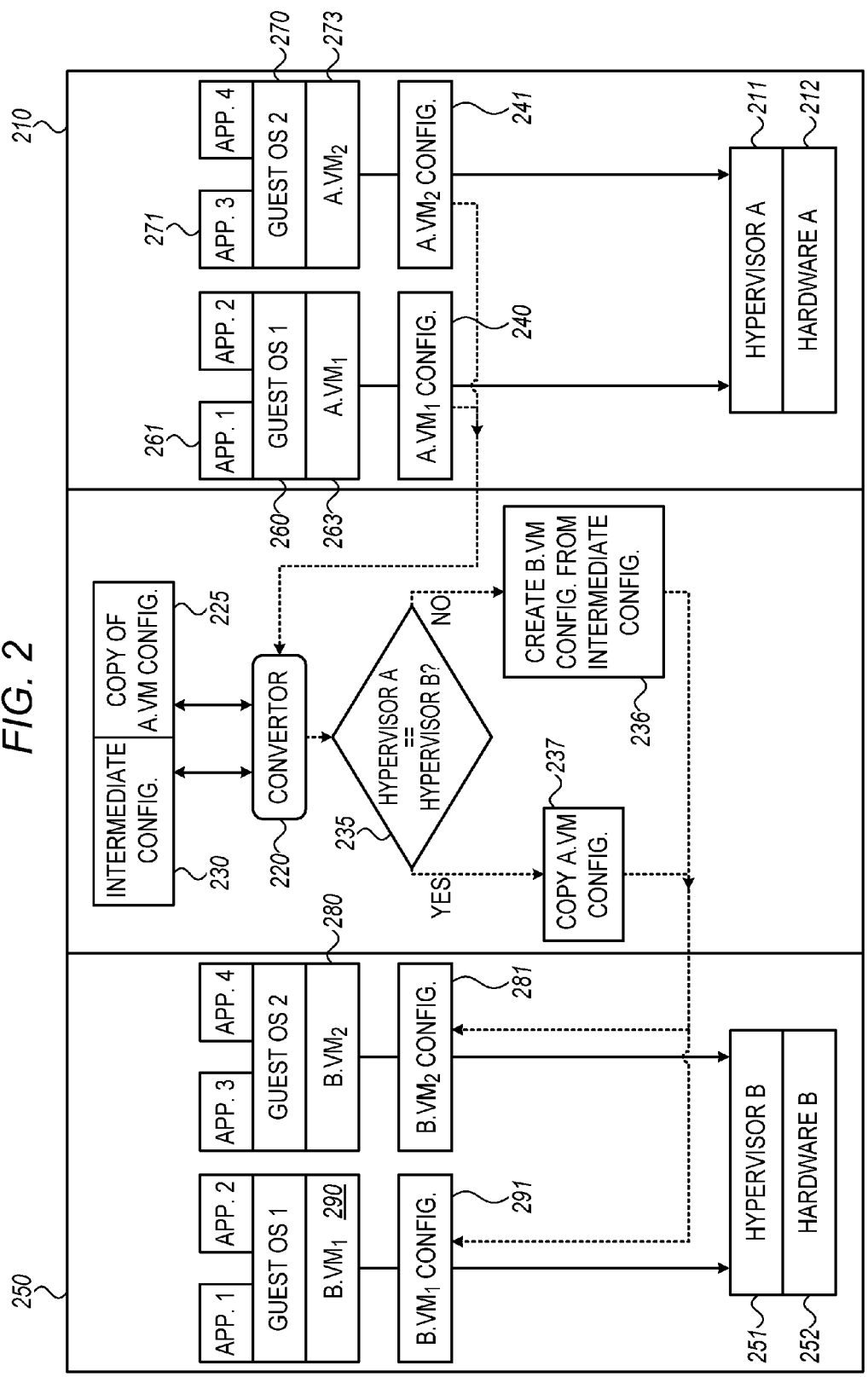
FIG. 2 is an overview of a system according to embodiments of the present invention.

Reference is made to FIG. 2, an overview of a system and flows according to embodiments of the present invention. As shown, a system may include a computing system 210 that may include hardware A 212 and hypervisor A 211. For example, hardware A 212 may be a physical machine or computer. As shown, systems 210 and 250 may be sub-systems included in, or operatively connected to, the system according to embodiments of the invention. As shown, a native configuration A.$VM_1$ configuration 240 may be used to create or establish a first virtual machine A.$VM_1$ 263 on hypervisor A 211. In other words, virtual machine A.$VM_1$ 263 is created based on A.$VM_1$ configuration 240, or A.$VM_1$ configuration 240 defines attributes, parameters and aspects of virtual machine A.$VM_1$ 263. For example, the size of a virtual disk provided or allocated to virtual machine A.$VM_1$ 263 is defined in A.$VM_1$ configuration 240.

As further shown, virtual machine A.VM1 263 enables a first guest operating system (Guest OS) 260 to run or execute on hypervisor A 211 and Guest OS 260 enables application 261 to run on computing system 210. Similarly and as shown, A.$VM_2$ configuration 241 may be used to create or establish a second virtual machine A.$VM_2$ 273 on hypervisor A 211 thus enabling a second Guest OS 270 to run or execute on hypervisor A 211. As shown, Guest OS 270 enables application 271 to run on system.

In an exemplary case, a user may wish to transfer or migrate guest OS 260 and/or guest OS 270 from computing system 210 to computing system 250. As shown, computing system 250 included in a system may include hardware B 252 and hypervisor B 251. Hypervisor B 251 may be the same as, or similar to, hypervisor A 211 or it may be a different hypervisor.

For example, both hypervisors A 211 and hypervisors B 251 may each be an instance of the commercial HV hypervisor provided by Microsoft or hypervisor A 211 may be an instance of the HV hypervisor and hypervisor B 251 may be an instance of the vSphere hypervisor provided by VMware. Other types of hypervisors may be used.

As shown, a system may include a convertor unit 220. Convertor unit 220 may be any suitable unit, module or device. For example, convertor unit 220 may be a stand-alone device, e.g., a device separate from both computing system 210 and computing system 250. In another embodiment, convertor unit 220 may be a unit included in computing system 210 or included in computing system 250. In yet another embodiment, convertor unit 220 may be split into two or more units. For example, convertor unit 220 may be or may include two units, one included in computing system 210 and another included in computing system 250. For the sake of clarity and simplicity, convertor unit 220 is shown and described as a separate unit, however, it will be understood that any various other configurations may be contemplated without departing from the scope of the invention.

Although only two guest operating systems are shown in systems 210 and 250 it will be understood that any number of guest operating systems may be included in a system according to embodiments of the invention and a system according to embodiments of the invention may convert, migrate or transfer any number of configurations from one system to another as described. For the sake of simplicity and clarity, the discussion herein mainly refers to guest OS 260, virtual machine A.VM$_1$ and A.VM$_1$ configuration 240, however, it will be understood that the discussion herein is relevant to guest OS 270, virtual machine A.VM$_2$ and A.VM$_2$ configuration 241.

Convertor unit 220 may analyze computing system 210 and may further identify, characterize or determine A.VM$_1$ configuration 240 (also referred to herein as a native configuration). Providers of hypervisors provide various tools for analyzing, determining and/or identifying a configuration of a system such as systems 210 and 250. Units in a system according to embodiments of the invention may use any tools, utilities, application program interfaces (API's) and the like in order to analyze, determine and/or identify a configuration of a system, a hypervisor, a virtual machine, hardware and other components of a system as described.

For example, parameters, values, aspects or configuration information such as virtual disks, memory, CPU and the like as defined by A.VM$_1$ configuration 240 may be identified, recorded, characterized or determined by convertor unit 220 and may be stored as shown by copy of A.VM configuration 225. For example, copy of A.VM configuration 225 may include any information or data required in order to reproduce one of A.VM$_1$ configuration 240 and A.VM$_2$ configuration 241.

A method according to embodiments of the invention may include exporting a configuration. For example, having identified, characterized or determined A.VM$_1$ configuration 240, convertor unit 220 may export the configuration of virtual machine A.VM$_1$ 263. For example, an exported configuration may include a native configuration and an intermediate configuration. For example, to export a configuration, e.g., onto a storage system, convertor unit 220 may store on the storage system a copy of a native configuration and an intermediate configuration. An intermediate configuration included in an exported configuration may be generated based on a native configuration. For example, to export a configuration of virtual machine A.VM$_1$ 263, convertor 220 may use A.VM$_1$ configuration 240 to generate an intermediate configuration and may then store or include both A.VM$_1$ configuration 240 and the generated intermediate configuration in a file. Accordingly, an embodiment may include exporting a configuration by providing both a native configuration and an intermediate configuration.

As referred to herein, a source system may be a computing system of which an intermediate configuration and/or a native configuration may be identified, exported, recorded and stored. For example, computing system 210 may be a source system. As referred to herein, a target system may be a computing system to which an intermediate configuration and/or a native configuration are imported or applied (e.g., computing system 250). For example, an intermediate configuration and/or a native configuration exported from a source system may be used to configure a target system. For example, computing system 250 may be a target system where an intermediate configuration and/or a native configuration exported from source computing system 210 are imported to target computing system 250. Using either an intermediate configuration or a native configuration to configure a target computing system may include establishing virtual machine on a target computing system. For example and as describe, if a native configuration should or may be used then an embodiment may use a native configuration to configure a target system or to establish a virtual machine on the target computing system, else, the embodiment may use an intermediate configuration to configure the target system or to establish a virtual machine on the target computing system.

An exported configuration may be used in order to import a configuration. For example, convertor 220 may use an exported configuration generated based on a configuration of a first system (a source system) in order to import the configuration to a second system (a target system). For example, convertor 220 may import a configuration by determining whether or not the system from which a configuration was exported is substantially the same as a system to which the configuration is to be imported and, if the systems are the same, use a native configuration in order to configure the second system. When importing an exported configuration, if the target system is different from the source system, or the native configuration is not provided, convertor 220 may use an intermediate configuration in order to configure the target system. In some cases or scenarios, an embodiment of a system or method may export a configuration in advance, e.g., even if there is no immediate need or intent to import the configuration. For example, a repository of exported configurations may be maintained such that, when needed, a previously exported configuration can be quickly or immediately used for configuring a target system or applied to a target system without having to wait for an export procedure.

It will be understood that using a native configuration as described herein may include copying the native configuration from a source to a target system (e.g., using "as is") or it may include generating a configuration based on the native configuration. For example, having analyzed both source and destination machines, convertor 220 may determine that a native configuration used to support a virtual machine in the source system may be used, as is, on the destination system, for example, if the same hypervisors and/or hardware are used in both systems. In another case, convertor 220 may extract parameters or values from a native configuration and use extracted values to configure a system. For example, if a source and destination systems are similar but not same or identical then some modifications to a native configuration may be required.

Convertor unit 220 may record a copy of A.VM$_1$ configuration 240 as shown by copy of A.VM configuration 225. Any information related to copy of A.VM configuration 225 may be recorded by convertor unit 220 in copy of A.VM configuration 225 such that A.VM$_1$ configuration 240 may be fully duplicated or restored on a virtual machine. For example and as described, convertor unit 220 may create (or re-create) A.VM$_1$ configuration 240 on computing system 250 using data in copy of A.VM configuration 225.

Convertor unit 220 may analyze computing system 250 and, as shown by block 235, convertor unit 220 may determine whether or not computing system 250 is similar to, or is the same as, computing system 210. For example, convertor unit 220 may determine whether or not hypervisor B 251 is an instance of the same hypervisor as hypervisor A 211. As shown by block 237, if hypervisor B 251 is an instance of the same hypervisor as hypervisor A 211 then convertor unit 220 may use a copy of A.VM$_1$ configuration 240 in order to enable guest OS 260 to run or execute on computing system 250. As further shown by block 236 and further described herein, if hypervisor B 251 and hypervisor A 211 are instances of different hypervisors or hypervisor types or a native configuration was not provided or cannot be used then convertor unit 220 may create a B.VM configuration based on data in intermediate configuration 230 and use the B.VM configuration in order to enable guest OS 260 to run or execute on computing system 250.

If convertor unit 220 determines or identifies that hypervisor B 251 and hypervisor A 211 are instances of the same hypervisor (or hypervisor type) then, in order to migrate guest OS 260 to computing system 250, convertor unit 220 may use a copy of A.VM$_1$ configuration 240 (e.g., as stored in copy of A.VM configuration 225) in order to create or establish virtual machine B.VM$_1$ on computing system 250. For example, if hypervisor B 251 and hypervisor A 211 are instances of the same hypervisor (or hypervisor type) then configuration B.VM$_1$ 291 may be a copy of A.VM$_1$ configuration 240 and, consequently, virtual machine B.VM$_1$ 290 may be similar or identical to virtual machine A.VM$_1$ 263. Similarly, if virtual machine B.VM$_2$ 280 is same as virtual machine A.VM$_2$ 273 then B.VM$_2$ 281 configuration may be a copy of A.VM$_2$ configuration 241.

Accordingly, to migrate guest OS1 260 from computing system 210 to computing system 250, a system and method according to embodiments of the invention may copy a native configuration (e.g., A.VM$_1$ configuration 240) from computing system 210 to computing system 250 thus eliminating the need to convert configurations as done by known systems and methods. Otherwise described, if the same hypervisor (or hypervisor instance) is running on a first and second machines then, in order to create or establish a virtual machine on the second machine, where the virtual machine on the second machine is the same as a virtual machine on the first machine, a system and method according to embodiments of the invention may copy a configuration of the virtual machine on the first machine to the second machine and use the copied configuration to re-create or re-produce the first machine on the second machine.

Based on analyzing computing system 210 and computing system 250, in particular, based on identifying hypervisor A 211 and hypervisor B 251, convertor unit 220 may determine computing system 210 and computing system 250 are different. For example, convertor unit 220 may determine that different hypervisors are used by computing system 210 and computing system 250.

If convertor unit 220 determines that computing system 210 and computing system 250 are different (e.g., different hypervisors are used) then convertor unit 220 may apply, create and/or store intermediate configuration 230. For example, intermediate configuration 230 may be a generic definition of a virtual machine. For example, intermediate configuration 230 may include definitions and/or configuration data for a virtual machine such as size of allocated memory, allocated CPU bandwidth, allocated disk space and so on. For example, native configuration A.VM$_1$ configuration 240 may include values of parameters, features or attributes only provided by a hypervisor of a specific vendor or type, such specific parameters may be omitted from an intermediate configuration 230 thus making intermediate configuration 230 a generic configuration that may be used or applied to configure any hypervisor.

Generally, using intermediate configuration 230, an embodiment of a system or method may transfer or migrate a configuration between different hypervisors. For example, as known in the art, all hypervisors support configuration of disks and memory to be allocated to a virtual machine, accordingly, intermediate configuration 230 may include definitions for disks and memory.

To migrate, copy, duplicate, re-create or establish a virtual machine on computing system 250 based on a configuration of a virtual machine on computing system 210, convertor unit 220 may use intermediate configuration 230. For example, the same disk size, memory size and the like configured for virtual machine A.VM$_1$ 263 on computing system 210 may be configured for B.VM$_1$ 290 on computing system 250 using information in intermediate configuration 230. Accordingly, an embodiment of a system or method may enable fast and efficient duplication of configurations by determining whether or not copying of the native configuration from the first to the second system is required. As described, if it is determined the native configuration is not required, an embodiment of a system or method may create a generic configuration and use the generic configuration in order to configure a second system such that is similar to, or provides similar services as, a first system.

As shown by block 236, a configuration may be generated or created based on an intermediate configuration. For example, to create B.VM$_1$ 291 configuration (used for establishing virtual machine B.VM$_1$ 290 on computing system 250) convertor unit 220 may use intermediate configuration 230. Generally, intermediate configuration 230 may include definitions or values that may be relevant or applicable to a number of hypervisors and copy of A.VM configuration 225 may include definitions or values that may be relevant or applicable to specific hypervisor. For example, as known in the art, parameters relevant to the Hyper-V hypervisor provided by Microsoft may be VM Generation, Memory weight, "CPUTypeName" and "ExpectedCPUUtilization" as known in the art. These parameters or properties are well known to professionals who specialize in configuring, or working with, the Microsoft Hyper-V hypervisor but may not be known to other professionals or engineers. Similarly, professionals working with the VMWare hypervisor are familiar with parameters or properties such as Hardware version, Number of cores per CPU, "ToolsConfigInfo" and flags in a construct named "VirtualMachineFlagInfo" but other professionals or engineers may not be familiar with these attributes.

However, parameters or properties such as Firmware type (e.g., Basic Input/Output System (BIOS), Unified Extensible Firmware Interface (UEFI) etc.), Number of CPUs/Cores, Disk controller type (e.g., Integrated Drive Electronics (IDE), Small Computer System Interface (SCSI) etc.), memory size, NIC media access control (MAC) address and "Guest operating system id" are part of, included in, or relevant to, both the Hyper-V hypervisor and the VMWare hypervisor. Parameters or properties relevant to a number of, or all types of hypervisors may be included in a generic or intermediate configuration, e.g., in intermediate configuration 230.

In an embodiment of a system and method, intermediate configuration 230 may be a generic configuration structure that includes entries for some or all attributes or parameters that are common to, or shared by a number of hypervisor types. For example, memory size, disk size and CPU power may be attributes or parameters that appear in, or are relevant to all hypervisor types and are therefore included in a generic or intermediate configuration. Entries in a generic or intermediate configuration (e.g., entries in intermediate configuration 230) may be filled or populated by examining a specific configuration and extracting relevant information from the specific configuration. For example, an instance of intermediate configuration 230 may be created by examining A.VM$_1$ configuration 240, identifying parameters such as memory size and disk size and populating the relevant entries in intermediate configuration 230 based on identified parameters in A.VM$_1$ configuration 240. An intermediate configuration 230 created based on information in A.VM$_1$ configuration 240 may be used to recreate or duplicate a virtual machine that is similar to virtual machine A.VM$_1$ 263 on computing system 250.

In an embodiment, a generic or intermediate configuration is generated by a module or unit on a source machine. For example, intermediate configuration 230 may be a generic configuration generated or created by a unit in computing system 210 based on a native configuration, e.g., based on A.VM$_1$ configuration 240 that may be viewed as a native configuration. The term "native configuration" is used to denote a configuration that is specific to a specific system or hypervisor type. An intermediate configuration, a native configuration (e.g., A.VM$_1$ configuration 240) and a hypervisor type of computing system 210 may be provided to a module or unit on computing system 250. To establish or create, on computing system 250, a virtual machine that is as close or similar to virtual machine A.VM$_1$ 263, a unit or module on computing system 250 may first examine the provided hypervisor type of computing system 210. If the hypervisor type of computing system 210 is the same as the hypervisor type of computing system 250 then the unit may simply use the provided native configuration to create a virtual machine on computing system 250. For example, a unit on computing system 250 may use A.VM$_1$ configuration 240 to create a virtual machine on computing system 250, e.g., B.VM$_1$ configuration 291 may be a copy of A.VM$_1$ configuration 240 and therefore virtual machine B.VM$_1$ 290 may be the same as A.VM$_1$ 263. If the hypervisors on computing system 210 and 250 are not the same or of the same type or a native configuration was not provided or cannot be used, a unit on computing system 250 may use the provided generic configuration to create virtual machine B.VM$_1$ 290. It will be understood that separate units on systems 210 and 250 may be used as described or a single unit such as convertor 220 may be used without departing from the scope of the invention. For example, the operations performed by units on systems 210 and 250 as described above may all be performed by convertor 220. For example, convertor 220 may generate an intermediate configuration 230, obtain a native configuration and a hypervisor type of computing system 210 and use the configurations and hypervisor type of computing system 210 to establish or create a virtual machine on computing system 250 as described.

Forward compatibility as known in the art is the capacity of a system or method to handle systems or methods that are not yet known when a system or method are designed. A system or method that is forward compatible may readily accept input intended for later versions of itself. Systems and methods according to embodiments of the invention are forward compatible. For example, using an intermediate configuration as described, systems and methods according to embodiments of the invention may readily transfer configurations related to future systems or hypervisors (e.g., future hypervisors types currently unknown) by extracting generic parameters such as disk size, memory size and the like from any configuration (including a configuration related to virtual machines running or executing on future, yet unknown hypervisors), populating a generic or intermediate configuration as described herein with the extracted parameters and using the generic or intermediate configuration to create virtual machines as described herein.

For example, an embodiment of a system or method may create and use an intermediate configuration as described herein based on a native configuration related to a future hypervisor provided at least some of the intermediate configuration fields can be populated as described, e.g., by extracting relevant data from the native configuration of the future hypervisor. Alternatively or additionally, a native configuration related to a currently known hypervisor may be used with future, yet unknown hypervisors by creating an intermediate or generic configuration and using the generic or intermediate configuration on a system running the future, yet unknown hypervisor as described. For example, assuming a future, yet unknown hypervisor supports at least some of the generic or common attributes described herein (e.g., disk and or memory size and type, CPU attributes and the like), a generic or intermediate configuration may be readily used to configure virtual machines on the future, yet unknown hypervisor.

It is noted that by copying a native configuration as described (e.g., A.VM configuration 225 may be a copy of native configuration A.VM$_1$ configuration 240), embodiments of a system or method according to the invention enable storing, replicating and/or using a configuration of a virtual machine efficiently, without losing any configuration data. By creating an abstraction of a virtual machine configuration in the form of an intermediate or generic configuration (e.g., intermediate configuration 230) an embodiment of a system or method according to the invention enables conversion of a configuration of a first virtual machine created on a first hypervisor type to a configuration of a second virtual machine created on a second hypervisor type, regardless of the types of the first and second hypervisors. In operation, a system according to embodiments of the invention needs not be modified in order to enable the system to incorporate VMs of different hypervisors. Accordingly, when using systems according to embodiments of the invention, development and maintenance costs are kept minimal. Moreover, using systems and methods according to embodiments of the invention, a developer only needs to be familiar with the hypervisors' VM native configuration and the intermediate configuration and needs not be familiar with other hypervisors' configuration aspects since an embodiment of a system or method according to the invention may automatically convert a first configuration (related to a first hypervisor) to a second configuration (related to a second hypervisor), e.g., by converting hypervisor specific properties to a common intermediate property in an intermediate configuration and vice versa.

In an embodiment, a system and method may save or store, in an intermediate configuration, hypervisor specific parameters and use such specific parameters or data when converting the intermediate configuration to a configuration that is usable by the specific hypervisor. For example, suppose a first specific configuration parameter "parameter A" is only applicable to, or supported by, a first specific hypervisor "A". Suppose further that a second specific configuration parameter "parameter B" is only applicable to, or supported by, a second specific hypervisor "B". An intermediate configuration (e.g., intermediate configuration 230) may include both "parameter A" and "parameter B" and an indication that "parameter A" is only relevant to hypervisor "A" and that "parameter B" is only relevant, related or usable by hypervisor "B". When converting the intermediate configuration, an embodiment of a system or method according to the invention may first determine the type of hypervisor for which the configuration is to be used and, if the hypervisor is hypervisor "A" then "parameter B" may be ignored and "parameter A" may be used to configure a virtual machine as described. Accordingly, an intermediate or generic configuration may be used to configure virtual machines on various hypervisor types, and hypervisor specific parameters or aspects may be supported.

For example, when replicating a VM from hypervisor type A to hypervisor type B then to hypervisor type C then back to hypervisor type A (original or in another system), parameters added to the intermediate configuration by hypervisor type A may be passed transparently throughout the hypervisor's chain (e.g., ignored when configuring a VM on hypervisors B and C) and may be extracted from the intermediate configuration and used only when using the intermediate configuration to configure a VM on hypervisor A. For example, tags or other means may be used to label or associate parameters in an intermediate configuration such that parameters are associated with specific hypervisors. For example, if a specific configuration parameter in an intermediate configuration is tagged as "hypervisor type A" then when using the intermediate configuration to configure a virtual machine on an instance of a hypervisor of type A, an embodiment of a system or method according to the invention may use the specific configuration parameter but, when using the intermediate configuration to configure a virtual machine on an instance of a hypervisor of type B or C, an embodiment of a system or method according to the invention may ignore the specific configuration parameter. Accordingly, a single intermediate configuration may be used to configure a plurality of different systems, e.g., a plurality of systems running a respective plurality of different hypervisors.

An embodiment of a system or method according to the invention may manage configuration aspects related or relevant to an entire system, e.g., configuration aspects related to a number of virtual machines in a system or configuration parameters that are relevant to a number of virtual systems as a whole. A configuration related to two or more virtual machines in a system, e.g., parameters that define or dictate interoperability of virtual machines may be referred to herein as system global configuration parameters.

For example, a boot sequence parameter in a global configuration on computing system 210 may indicate that guest OS2 270 is only started after guest OS1 260 is up and running. Other global configuration parameters may govern sharing of resources, priorities, inter-dependencies and the like. Convertor 220 (or another unit in a system according to embodiments of the invention) may transfer global configuration parameters from one system to another. For example, both a native global configuration and intermediate global configuration may be generated based on global configuration parameters in computing system 210 and the native global configuration and intermediate global configuration may be used to configure computing system 250. For example, when migrating guest OS2 270 and guest OS1 260 from computing system 210 to computing system 250, a boot sequence may be preserved by applying global configuration parameters identified in computing system 210 to computing system 250. Generally, global configuration parameters may be determined by examining or analyzing any relevant elements of a system (e.g., a hypervisor, hardware etc.) and a generic or intermediate configuration and a native configuration may be generated as described herein.

For example, information related to a hardware machine or to a hypervisor may be included in a global configuration file and may be used for coordinating configurations of a number of virtual machines. For example, if guest OS1 260 is guaranteed to be allocated 16 GB of RAM (e.g., as part of an agreement) and guest OS2 270 is provided with any amount available (e.g., it provides a free service with no guarantees) then, if hardware 212 includes 32 GB of RAM then guest OS2 270 may be provided with 16 GB of RAM in computing system 210. However, if both guest OS1 260 and guest OS2 270 are migrated to computing system 250 and hardware 252 only has 24 GB of RAM then OS2 270 may only be provided with 8 GB of RAM. Such migration of a number of guest operating systems may be enabled using global parameters such as amount of physical RAM. Accordingly, a system and method according to embodiments of the invention may transfer or migrate a complex system that includes a plurality of guest operating systems from one hardware infrastructure to another hardware infrastructure while preserving the overall configuration of the a complex system. For example, an overall configuration of the a complex system may include a boot sequence of operating systems, a priority or precedence given to operating systems with respect to using resources and the like.

A global parameter may be a parameter, or any configuration information, related to the hardware machine in a system. In an embodiment, convertor unit 220 or import unit 320 may dynamically modify a global parameter, e.g., a parameter related to the hardware of a target system or VM. For example, a global parameter may be dynamically or automatically modified before a configuration is used, for example, in order to maintain compatibility of the configuration with a target system.

For instance: Hyper-V G1 (provided by Microsoft) VMs only support boot from disks attached to an IDE controller while VMWare VMs support boot from either IDE or SCSI controllers. If, when configuring a Hyper-V based system, import unit 320 receives as input a configuration (e.g., an intermediate configuration) that includes or specifies boot disks attached to a SCSI controller, import unit 320 may modify the input configuration, e.g., include an IDE controller in the configuration and attach a boot disk to the IDE controller.

As discussed, FIG. 2 and related text describe one possible configuration or embodiments of the invention and other configurations or embodiments may be contemplated. For example, instead of a single convertor unit 220, two units may be used.

Figure 3:
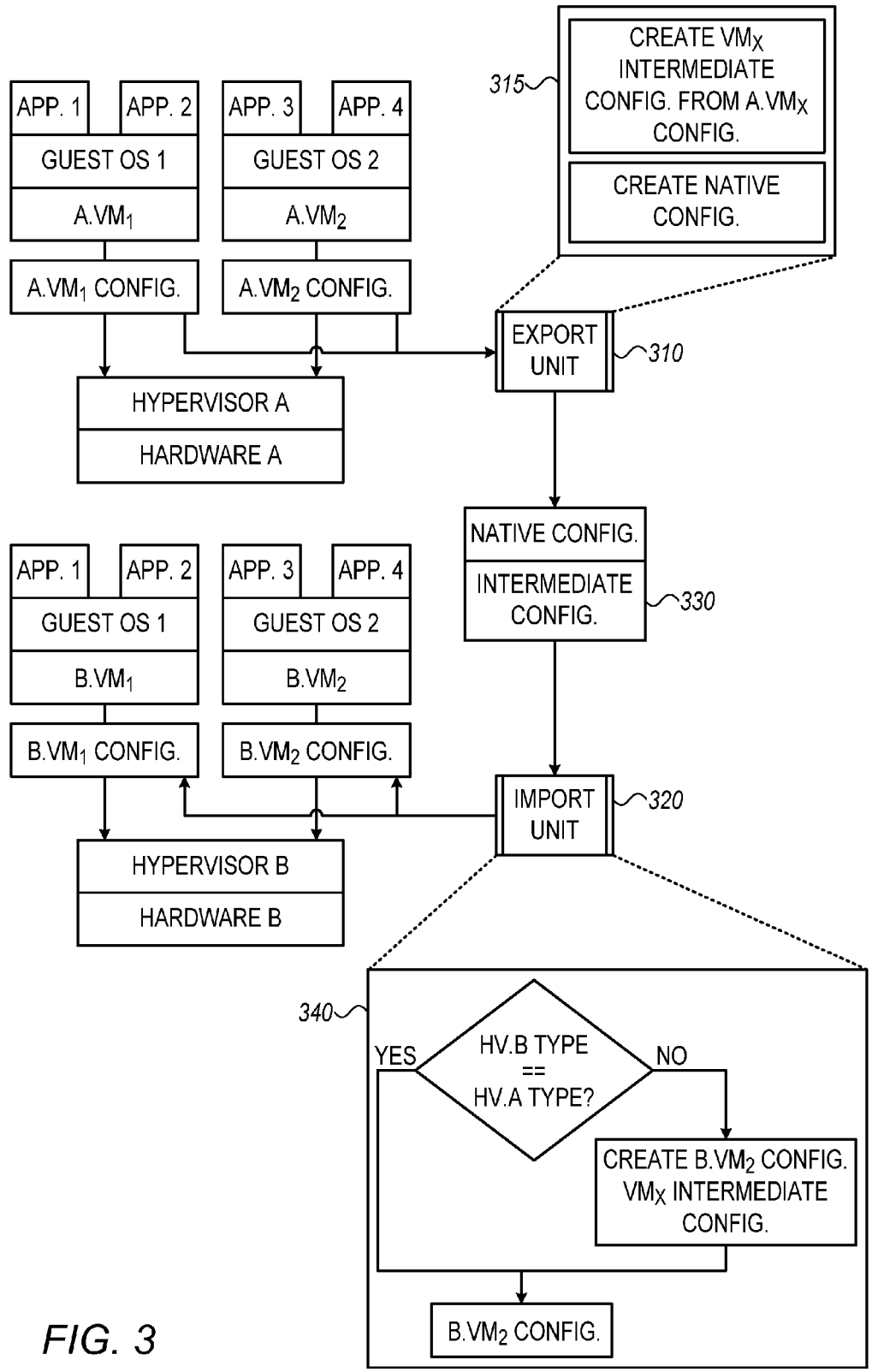
FIG. 3 is an overview of a system according to embodiments of the present invention.

Reference is made to FIG. 3, an overview of a system and flows according to embodiments of the present invention. As shown, other than elements shown in FIG. 2 and described herein, a system may include an export unit 310 and an import unit 320. In an embodiment, export unit 310 and import unit 320 may include elements or components of computing device 100 as described herein. For example, convertor 220, export unit 310 and import unit 320 may include at least a memory 120 and a controller 105.

In an embodiment, export unit 310 may receive or accept a native configuration and use the native configuration to generate, create and provide an intermediate configuration. For example, export unit 310 may receive (or obtain from a source system) a native configuration and return an object that contains or includes the intermediate configuration, created based on the native configuration, or both the native configuration and an intermediate configuration. In an embodiment, import unit 320 may receive an object provided by export unit 310 and may select to either use a native configuration in the object (if included, possibly after modifying parameters therein) or use an intermediate configuration in the object in order to configure a target machine. For example, using parameters and values in an intermediate configuration, import unit 320 may create a new native configuration for a target system and configure the target system using the new native configuration. For example, an object produced by export unit 310 and/or received by import unit 320 as described herein may be a file that contains or includes the configurations.

As shown by block 315, export unit 310 may accept or receive a native configuration (e.g., A.VM$_1$ configuration 240) and create a corresponding intermediate configuration. Using a received native configuration, export unit 310 may create (or simply store) a native configuration as further shown by block 315. Creating a native configuration may include simply copying a configuration from a source system (e.g., copying A.VM$_2$ configuration) or it may include modifying some information in a copied, extracted or otherwise obtained configuration of a system. As described, a native configuration may be used to create an intermediate configuration and the two configurations may be stored or provided together (e.g., to enable import unit 320 to select one of the provided intermediate configuration and native configuration).

Output produced by export unit 310 may be provided to import unit 320 as shown by block 330. For example, an intermediate configuration and/or a native configuration produced by export unit 310 may be or may be included in a file that may be stored, provided or sent as known in the art. For example, export unit 310 may store an intermediate configuration and/or a native configuration as files in a database and import unit 320 may retrieve an intermediate configuration and/or a native configuration from the database.

Although block 330 shows both a native configuration and an intermediate configuration provided by export unit 310, in an embodiment, export unit 310 may only create and/or provide only one of these configurations. For example, to minimize network payload or increase security, export unit 310 may only provide an intermediate configuration (without the native configuration). Provided only with an intermediate configuration, import unit 320 may create a native configuration for a target system based on the provided intermediate configuration (possibly losing some of the original configuration parameters of the source system), and may configure a target system based on the created native configuration.

As shown, import unit 320 may receive an intermediate configuration and/or a native configuration. Other data provided to import unit 320 may be the type of hypervisor for which the intermediate configuration and/or native configuration were produced and any other information related to a source system from which export unit 310 exported an intermediate configuration and/or a native configuration.

As shown by block 340, import unit 320 may determine whether a native configuration or an intermediate configuration should be used on a target system. For example and as shown, if the type of hypervisor used on the target system is same as the one used on the source system and a native configuration was provided, import unit 320 may configure the target system based on the native configuration. For example, if possible, e.g., if the source and target systems are identical, import unit 320 may simply copy a received native configuration or use a received native configuration as is to configure the target system. In other cases, import unit 320 may use a native configuration as basis for configuring a target system, e.g., apply some changes to a received native configuration before using it to configure the target system. Accordingly, using a native configuration as described, an embodiment of a system or method according to the invention may efficiently and quickly configure a target system based on a configuration of a source system.

As further shown by block 340, if the source and target systems are not the same or similar or a native configuration was not provided, e.g., different hypervisors are used on these systems, import unit 320 may use the intermediate configuration. For example, the intermediate configuration may include generic configuration parameters (e.g., ones used by all or most or hypervisors). Using an intermediate configuration may include transforming or translating parameters from their generic representation to a representation that is specific to a specific system or hypervisor. Accordingly, although different hypervisors may be used on a source and target systems, a system and method according to embodiments of the invention may configure the target system based on a configuration of the source system using the intermediate configuration as described.

A system and method according to embodiments of the invention may be modular. For example, a system may be designed to accept export and import modules designed for specific hypervisors. For example, one instance of export unit 310 may be a module specifically designed for a specific hypervisor and another instance may be specifically designed for another hypervisor. As new hypervisors are introduced to the market, new modules such as export unit 310 may be created. accordingly, a system and a method as a whole may be forward compatible, capable of exporting and importing configurations of new systems or hypervisors by simply adding new export and import modules.

For example, to create an intermediate configuration and/or a native configuration for a specific source system (a system from which a configuration is to be exported), a management unit (not shown) in a modular system may receive as input (or may automatically identify) a type of a hypervisor in a source and may run or execute a specific instance of export unit 310 to create the intermediate configuration and/or a native configuration for the system. To import the configuration to a specific target system (a system to which a configuration is to be imported or applied), the management unit may receive as input (or may automatically identify) the type of a hypervisor in the target system and may run or execute a specific instance of import unit 320 to configure the target system using the intermediate configuration and/or a native configuration.

Accordingly, by simply adding two specific convertors (or a single two way convertor such as convertor 220) when future hypervisor types are introduced a system may maintain forward compatibility.

For example, import and export modules or units that are only familiar with their defined hypervisor may be created and used as required. To support compatibility, when receiving both an intermediate configuration and a native configuration, import unit 320 may check that a native configuration is provided, recognized and can be used, e.g., by checking a predefined field or identifier in the native configuration, e.g., the hypervisor type. If import unit 320 does not recognize or support the native configuration or it is not provided or cannot be used it may use the intermediate configuration that was delivered with the native configuration. Accordingly, a unit may selectively use one of an intermediate configuration and a native configuration to configure a system. For example, import unit 320 may include logic that causes it to use an intermediate configuration if the hypervisor type in a native configuration does not match a predefined type.

As described, an embodiment of a system or method according to the invention may discreetly store configuration parameters in a configuration and/or discreetly extract configuration parameters from a configuration. For example, a management unit may cause export unit 310 to include a specific number of CPU cores in a native or intermediate configuration, e.g., in order use, in a target system, less CPU cores than those used in a source system. For example, the CPUs count and cores per CPU on a hypervisor provided by VMWare may be changed for a system using the hyper-V hypervisor provided by Microsoft.

Parameters for a specific hypervisor type may be saved (e.g., in a native configuration file) and may be used, e.g., when using the native configuration to configure (or re-configure) the original hypervisor, for example, in case of reverse replication.

As described, tags or other identifiers may be attached to, or associated with parameters relevant to a specific hypervisor type and may be ignored when dealing with other hypervisor types. For example, when configuring a system, import unit 320 may be provided with a specific hypervisor type and may ignore parameters in an intermediate configuration file that are marked or tagged as relevant to other hypervisor types.

Import unit 320 may modify attributes or configuration parameters related to, or describing a guest OS. For example, information related to a guest OS that needs to be provided to a hypervisor may be modified, e.g., in order to hide specific data from the hypervisor or substitute a parameter not supported by the hypervisor with one supported.

For example, when configuring a system if import unit 320 determines, identifies or decides that a guest OS is not supported by the target system (e.g., the hypervisor on the target system does not support the guest OS running on the source system) then the system or method may attempt to match or select the best guest OS that can enable a VM to boot and/or function properly on the target system. For example, in transferring guest OS1 260, convertor 220 may realize or determine that hypervisor B 251 does not support guest OS1 260, convertor 220 may configure hypervisor B 251 as if is of a supported guest OS is to be executed on hypervisor B 251.

For example, the VMWare vCenter hypervisor 5.5 may not support Windows 2012 or Windows 2012R2, in such case, after exporting a configuration from the Microsoft hyperV hypervisor, to import the configuration to a VMWare hyperV hypervisor, convertor 220 may use Windows 2008 R2 as the type of the guest operating system type. In another case, HyperV does not support a unique identifier for 'Suse linux Enterprise Server 12 32 bit', in this case import unit 320 may map (or modify) the guest OS type or identification to 'Suse linux Enterprise Server 11 32 bit' which is known to, and supported by, HyperV. For example, based on verifying (e.g., in a lab) that a hyperV hypervisor can properly and safely run 'Suse linux Enterprise Server 12 32 bit', an embodiment of a system or method according to the invention may report to a HyperV hypervisor that a guest OS which is 'Suse linux Enterprise Server 12 32 bit' is 'Suse linux Enterprise Server 11 32 bit'.

Figure 4:
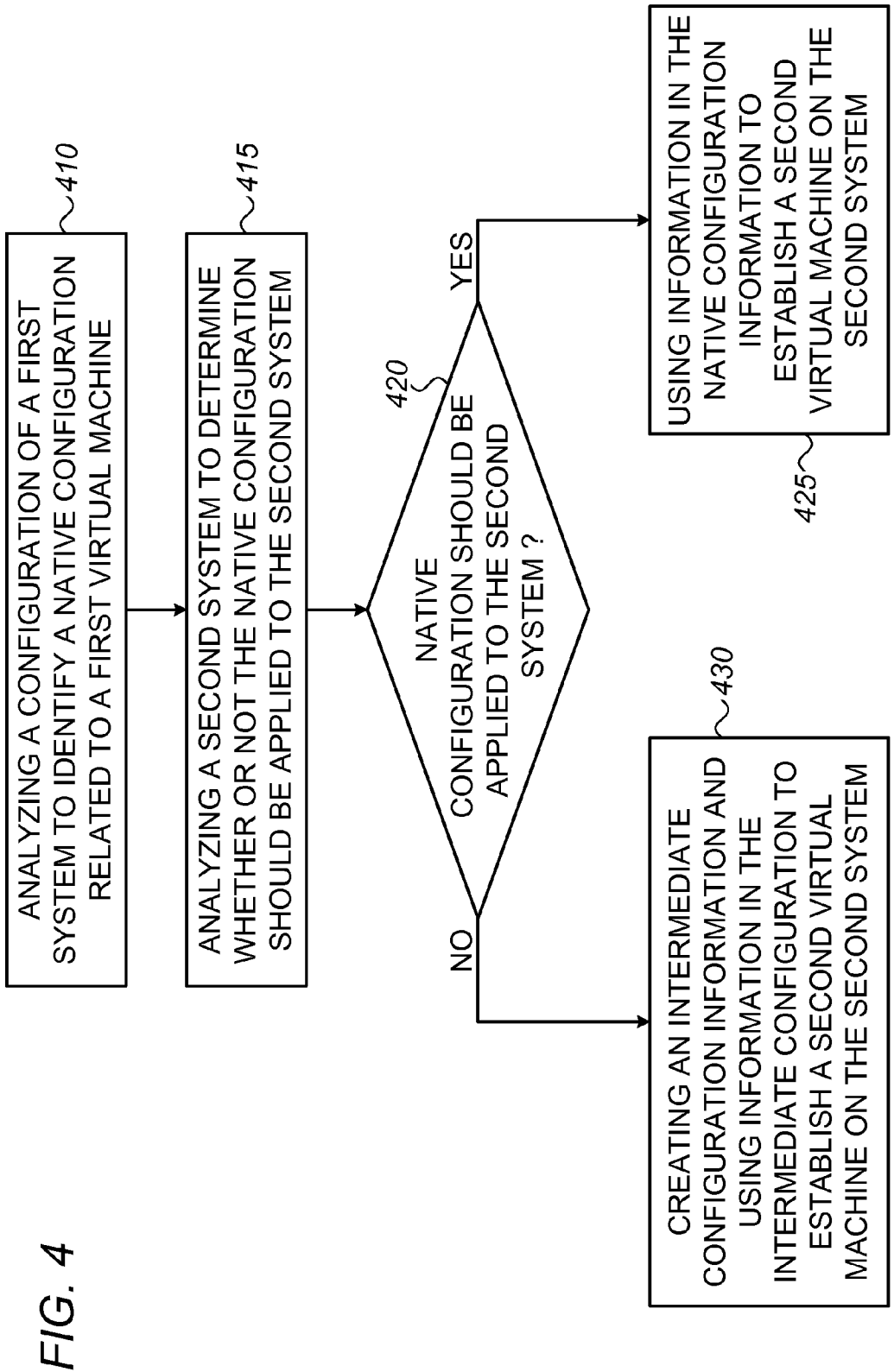
FIG. 4 shows a flowchart of a method according to an embodiment of the present invention.

Reference is made to FIG. 4, a flowchart of a method according to an embodiment of the present invention. As shown by block 410, a configuration of a first system may be analyzed to identify a native configuration related to a first virtual machine. For example, using tools known in the art (e.g., utilities and APIs provided by a provider of a hypervisor), import unit 320 may analyze computing system 210 and identify or characterize a configuration of virtual system A.VM$_1$ 263. As described, a configuration identified or characterized may be stored (e.g., in a file) and/or sent, e.g., over a network. As described, a configuration identified or characterized may include an intermediate (or generic) configuration and/or a native configuration. In an embodiment, analyzing and generating a configuration may include, e.g., at a first phase, only identifying and creating or providing, an intermediate (or generic) configuration and a native configuration may be created, e.g., if required at a later phase, based on the native configuration.

In an embodiment, a plurality of virtual machines on the first system are identified. For example, a native configuration file or object, or a plurality of native configuration objects may be created by import unit 320. For example, based on examining computing system 210, a native configuration or a plurality of native configuration objects created and provided by import unit 320 may include information usable to configure computing system 250 to support both virtual machines A.VM$_1$ 263 and A.VM$_2$ 273, such that inter-dependencies between A.VM$_1$ 263 and A.VM$_2$ 273, when executed on computing system 250, are preserved. For example, the a percentage of the available physical memory allocated to each virtual machine is preserved, a scheme, criterion or rule for allocating CPU bandwidth is preserved and so on.

As shown by block 415, a second system may be analyzed and based on the analysis, a decision of whether or not the native configuration should be applied, or used to configure a second system. For example, import unit 320 may analyze computing system 250 to identify information relevant to a decision of whether or not native configuration A.VM$_1$ configuration 240 may, can or should be used to configure computing system 250 in order for computing system 250 to execute virtual machine A.VM$_1$ 263. As shown by block 420, a decision of whether or not the native configuration should be used to configure a second system is made.

The factors that may cause an embodiment to decide whether or not to use a native configuration to configure a target computing system may include, at least, whether or not the same or similar hypervisors are executed on both a source computing system and a target computing system. For example, if the same or similar hypervisors are executed on both a source computing system and a target computing system then an embodiment may use the native configuration to configure the target computing system or otherwise apply the native configuration. For example, if the hypervisor executed on the source computing system is different from the hypervisor executed on the target computing system then an embodiment may use an intermediate configuration to configure the target computing system for example, an embodiment may apply the intermediate configuration by generating a configuration for the target computing system based on information in the intermediate configuration, e.g., extract parameters and values from the intermediate configuration and use the extracted values to configure the target computing system.

As shown by block 425, if it is decided to use or apply the native configuration then the configuration may be applied in that information in the native configuration may be used to configure the second system, e.g., information in a native configuration object (e.g., A.VM$_1$ configuration 240) is used by import unit 320 to establish virtual machine B.VM$_1$ 290 on computing system 250. For example, B.VM$_1$ configuration 291 may be a copy of A.VM$_1$ configuration 240 or it may be a modified version of A.VM$_1$ configuration 240. For example, applying a configuration or using information in a native configuration object, produced based on a first system, to establish a second virtual machine on a second system may include modifying parameters in the native configuration object before using the information to created, configure or establish the second virtual machine.

If it is determined that a hypervisor instance running on a first system is substantially the same as a hypervisor instance running on the second system the system or method may select to copy a native configuration from a first virtual machine to a second virtual machine. For example, if hypervisors A 211 and hypervisors B 251 are instances of the same hypervisors then import unit 320 may simply copy A.VM$_1$ configuration 240 to computing system 250 in order to enable application 261 to execute on computing system 250 (e.g., B.VM$_1$ configuration 291 is a copy of A.VM$_1$ configuration 240).

Accordingly, a second virtual machine may be configured such that a guest operating system executing on the first virtual machine can be executed on the second virtual machine substantially unchanged. For example, guest OS1 260 may be unaware of whether it is executing on computing system 250 or on computing system 210 since the underlying layers, e.g., virtual machine A.VM$_1$ 263 and B.VM$_1$ 290 in systems 210 and 250 may seem identical to guest OS1 260.

A second virtual machine configured as described may be executed on a hardware machine that is different from the hardware machine executing the first virtual machine. For example, virtual machine B.VM$_1$ 290 may be similar or identical to virtual machine A.VM$_1$ 263 yet the two virtual machines are executed on separate hardware machines that may be geographically distant from one another.

As shown by block 430, an intermediate configuration may be created based on the native configuration. For example, if it is determined that the native configuration cannot or should not be used to configure the second system then an intermediate configuration may be generated and/or provided. As further shown by block 430, information in the intermediate configuration may be used to establish a second virtual machine on the second system.

An intermediate configuration information object may include at least one configuration parameter that is supported by at least two different hypervisors. For example, parameters such as number of CPU cores and size of memory may be represented in an intermediate configuration in a standardized, regulated, uniform or predefined manner. Accordingly, regardless of the system based on which an intermediate configuration was created and regardless of the unit that created an intermediate configuration object, any unit in a system according to embodiments of the invention may use information in an intermediate configuration. For example, the same intermediate configuration object may be used to configure two different systems executing two different types of hypervisors. Accordingly, a single object including intermediate configuration information (e.g., a file) may be usable to establish a plurality of virtual machines on a plurality of different virtualization infrastructures.

An intermediate configuration object may include a specific configuration parameter that may only be usable to configure a first system that includes a first, specific hypervisor. When using the intermediate configuration object to configure a second system, a system and method according to embodiments of the invention may first determine whether or not a hypervisor instance running on the first system is substantially the same as the hypervisor instance running on the second system, e.g., are the two hypervisors provided by the same provider and are both the same version. If the two hypervisors are the same or similar, the specific configuration parameter may be used to configure the second system. However, if the two hypervisors are not the same or are not similar, the specific configuration parameter may be ignored when configuring the second system. Accordingly, a single intermediate configuration object may be used to configure a plurality of systems running a respective plurality of different hypervisors. It will be understood that an intermediate configuration object may include a plurality of specific configuration parameters that are relevant to a respective plurality of hypervisors types. According to embodiments of the invention, when using an intermediate configuration object, some specific configuration parameters are selected for use based on the type of the hypervisor being configured and other specific configuration parameters are ignored.

In an embodiment, tags indicating a compatibility with a specific hypervisor may be associated with parameters in an intermediate configuration. For example, all parameters supported only by the Hyper-V hypervisor may be tagged or marked in an intermediate configuration. For example, parameters or fields in an intermediate configuration tagged as "Hyper-V" may be used or applied when using the intermediate configuration to configure a virtual machine on a Hyper-V hypervisor but may be ignored, e.g., by import unit 320, when using the intermediate configuration to configure a virtual machine on a vSphere hypervisor.

According to embodiments of the invention creating an intermediate configuration may include storing a property of a hypervisor in a predefined field, entry or variable in the intermediate configuration information. For example, the type of the hypervisor in computing system 210 may be included (e.g., as a 32 bit scalar as known in the art) in copy of A.VM configuration 225 such that a unit that uses copy of A.VM configuration 225 may know the type of hypervisor A 211.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method executed by a processor of managing a configuration of a virtual machine, the method comprising:
    analyzing a configuration of a first computing system to identify a native configuration related to a first virtual machine;
    analyzing a second computing system to determine whether or not to use the native configuration to configure a second virtual machine on the second computing system, wherein if a hypervisor instance running on the first computing system is the same as a hypervisor instance running on the second computing system, then use the native configuration to configure the second virtual machine, otherwise do not use the native configuration to configure the second virtual machine; and
    if the native configuration is selected to configure the second virtual machine then copy the native configuration from the first virtual machine to the second virtual machine, and
    if the native configuration is not used to configure the second virtual machine then using the native configuration information to a) create intermediate configuration information, wherein the intermediate configuration information includes configurable parameters that are common to the first virtual machine and the second virtual machine, and b) using the intermediate configuration information to configure and establish the second virtual machine on the second computing system.

2. The method of claim 1, wherein the intermediate configuration information includes at least one configuration parameter supported by at least two different hypervisors.

3. The method of claim 1, wherein the second virtual machine is configured such that a guest operating system executing on the first virtual machine can be executed on the second virtual machine substantially unchanged.

4. The method of claim 1, wherein a system uses a single object including an intermediate configuration information to establish a plurality of virtual machines on a plurality of different virtualization infrastructures.

5. The method of claim 1, wherein the intermediate configuration information includes a configuration parameter usable with the first hypervisor and wherein:
 if the hypervisor instance running on the first computing system is substantially the same as the hypervisor instance running on the second computing system then using the configuration parameter to configure a virtual machine on the second computing system, and
 if the hypervisor instance running on the first computing system is not the same as the hypervisor instance running on the second computing system then ignoring the configuration parameter.

6. The method of claim 1, wherein creating the intermediate configuration comprises representing a property of the first hypervisor by a predefined field in the intermediate configuration information.

7. The method of claim 1, comprising identifying a plurality of virtual machines on the first computing system and configuring the second computing system to support the plurality of virtual machines and preserve inter-dependencies between the plurality of virtual machines.

8. The method of claim 1, comprising associating tags with parameters in the intermediate configuration wherein a tag associated with a parameter indicates a compatibility of the parameter with a specific hypervisor.

9. A system comprising:
 a memory; and
 a controller, the controller configured to:
  analyze a configuration of a first computing system to identify a native configuration related to a first virtual machine;
  analyze a second computing system to determine whether or not to use the native configuration to configure a second virtual machine on the second computing system, wherein if a hypervisor instance running on the first computing system is the same as a hypervisor instance running on the second computing system, then use the native configuration to configure the second virtual machine, otherwise do not use the native configuration to configure the second virtual machine; and
  if the native configuration is selected to configure the second virtual machine then copy the native configuration from the first virtual machine to the second virtual machine, and
  if the native configuration is not used to configure the second virtual machine then using the native configuration information to a) create intermediate configuration information, wherein the intermediate configuration information includes configurable parameters that are common to the first virtual machine and the second virtual machine, and b) using the intermediate configuration information to configure and establish the second virtual machine on the second computing system.

10. The system of claim 9, wherein the intermediate configuration information includes at least one configuration parameter supported by at least two different hypervisors.

11. The system of claim 9, wherein the second virtual machine is configured such that a guest operating system executing on the first virtual machine can be executed on the second virtual machine substantially unchanged.

12. The system of claim 9, wherein a single object including an intermediate configuration information is usable to establish a plurality of virtual machines on a plurality of different virtualization infrastructures.

13. The system of claim 9, wherein the intermediate configuration information includes a configuration parameter usable with the first hypervisor and wherein the controller is configured to:
 if the hypervisor instance running on the first computing system is substantially the same as the hypervisor instance running on the second computing system then using the configuration parameter to configure a virtual machine on the second computing system, and
 if the hypervisor instance running on the first computing system is not the same as the hypervisor instance running on the second computing system then ignoring the configuration parameter.

14. The system of claim 9, wherein creating the intermediate configuration comprises representing a property of the first hypervisor by a predefined field in the intermediate configuration information.

15. The system of claim 9, wherein the controller is configured to identify a plurality of virtual machines on the first computing system and configuring the second computing system to support the plurality of virtual machines and preserve inter-dependencies between the plurality of virtual machines.

16. The system of claim 9, comprising associating tags with parameters in the intermediate configuration wherein a tags indicates a compatibility with a specific hypervisor.

* * * * *